(12) United States Patent
Wyczalkowski et al.

(10) Patent No.: US 8,323,359 B2
(45) Date of Patent: Dec. 4, 2012

(54) MULTI-STAGE CRYSTALLIZATION APPARATUS AND METHOD

(75) Inventors: Wojciech Wyczalkowski, Harrisburg, PA (US); Robert W. Higbee, Harrisburg, PA (US); Chris Hibshman, Hummelstown, PA (US); Kevin Smith, Monogahela, PA (US); Robert Peter Dowd, Lebanon, PA (US); Carl P. Laird, White Oak, PA (US)

(73) Assignees: Philadelphia Mixing Solutions, Ltd, Palmyra, PA (US); Carmeuse Lime, Inc., Pittsburgh, PA (US)

( * ) Notice: Subject to any disclaimer, the term of this patent is extended or adjusted under 35 U.S.C. 154(b) by 601 days.

(21) Appl. No.: 12/614,200

(22) Filed: Nov. 6, 2009

(65) Prior Publication Data

US 2011/0110831 A1    May 12, 2011

(51) Int. Cl.
*B01D 9/00* (2006.01)
(52) U.S. Cl. .................................. 23/295 R; 422/245.1
(58) Field of Classification Search ................ 23/295 R, 23/300; 422/245.1
See application file for complete search history.

(56) References Cited

U.S. PATENT DOCUMENTS

| 5,213,782 | A  | 5/1993 | Moser et al. |
| 6,334,705 | B1 | 1/2002 | Weetman |
| 2009/0231952 | A1 | 9/2009 | Higbee |
| 2009/0238033 | A1 | 9/2009 | Wyczalkowski |

*Primary Examiner* — Edward Johnson
(74) *Attorney, Agent, or Firm* — Woodcock Washburn LLP

(57) ABSTRACT

A crystallizer system for forming solid crystals includes a vessel defining a cylindrical sidewall, a sparge device located at a bottom of the vessel, a plurality of impellers attached to a shaft, and a plurality of redistribution funnel assemblies vertically spaced apart. Each funnel assembly may be positioned underneath a respective impeller of the plurality of impellers. Each funnel assembly may include a funnel, a disc attached to the shaft such that the disc rotates with the impellers, and a channel extending radially inward from a location near the sidewall. The channel may be adapted to direct gas bubbles from the sidewall to a location near blade outer edges of the respective impeller A lower edge of the funnel and the disc may define a lower gap therebetween, such that solid particles falling from within the funnel are directed out of the lower gap when the disc is rotated.

23 Claims, 5 Drawing Sheets

MULTI-STAGE CRYSTALLIZATION APPARATUS AND METHOD

TECHNICAL FIELD

The present invention generally relates to a crystallization apparatus and method. More particularly, the present invention relates to a multi-stage crystallization apparatus and method for ex situ oxidation and crystallization of gypsum as a product of flue gas desulfurization.

BACKGROUND

Flue gas desulfurization removes sulfur dioxide from the flue gas emitted during some manufacturing processes, including for example, power generation using high sulfur coal as the energy source. One of the byproducts of flue gas desulfurization is calcium sulfite hemihydrate, which can be oxidized and crystallized to produce gypsum for use by wallboard and cement manufacturers. Ex situ oxidation and crystallization is one of several alternatives of gypsum production from flue gases that contain sulfur dioxide. Ex situ oxidizers convert calcium sulfite hemihydrate to gypsum (calcium sulfate dehydrate) via the following reaction:

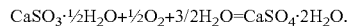

$$CaSO_3 \cdot \tfrac{1}{2}H_2O + \tfrac{1}{2}O_2 + 3/2H_2O = CaSO_4 \cdot 2H_2O.$$

Oxidation of calcium sulfite to produce calcium sulfate occurs only in liquid phase, so the calcium sulfite solids and oxygen must be dissolved into a liquid or slurry (including water) for the oxidation process to occur. In a typical ex situ oxidation and crystallization system, calcium sulfite slurry is fed into the oxidizer, oxygen-rich air is sparged into the oxidizer, and the calcium sulfites react with dissolved oxygen to form calcium sulfates (i.e., gypsum crystals). The gypsum crystal solids are agitated to remain in the liquid long enough to grow to a sufficient size for commercial use. Once the gypsum crystals reach a desired minimum size, they precipitate out of the liquid and are collected.

Conventional ex situ oxidizers that produce gypsum from calcium sulfite hemihydrate typically pump air into the oxidizer tank via an elaborate grid sparger. The elaborate grid sparger performs two functions: (i) distributing air across the cross-sectional area of the oxidizer tank, and (ii) keeping suspended solids agitated and moving.

Such conventional grid sparger systems typically have some operational disadvantages. For example, conventional grid sparger systems may produce large air bubbles that are less efficient at mass transfer than small air bubbles. A sparger typically releases small bubbles into the bottom of the tank, and these small bubbles coalesce into large air bubbles by the time the air rises to the liquid surface. Oxidation of calcium sulfite hemihydrate to produce gypsum requires mass transfer of oxygen from the air bubbles to the calcium sulfite hemihydrates, so large air bubbles that have a relatively low surface area do not produce as high mass transfer or utilization of oxygen from the air as small air bubbles. Also, some conventional gypsum crystallizers rely on the sparged air to provide agitation of the liquid to keep the gypsum crystals suspended during crystal formation, so use of a conventional grid sparger to provide liquid agitation may require a larger volume of air than is required for oxidation of the calcium sulfite hemihydrate.

Also, such conventional grid sparger systems typically have some cost and maintenance-related disadvantages. For example, if an oxidizer produces relatively large air bubbles that have a low mass transfer rate, a larger, more powerful air compressor may be needed that costs more to purchase and requires more energy to operate than a smaller air compressor. When large air bubbles reach the liquid surface, they may erupt violently from the liquid, which may introduce excess vibration into the oxidizer, thereby potentially reducing the life of the oxidizer components. Conventional grid spargers also require an extensive support and anchoring system on the tank floor that restricts access to some portions of the oxidizer and is expensive to install. It would be desirable to have an improved apparatus and method for crystallization of gypsum from flue gas desulfurization.

SUMMARY

A crystallizer system for forming solid crystals and a method of forming solid crystals are disclosed. A crystallizer system for forming solid crystals includes a vessel defining a cylindrical sidewall, a sparge device located at a bottom of the vessel, an impeller assembly including a shaft and a plurality of impellers attached to the shaft, and a plurality of redistribution funnel assemblies vertically spaced apart. The sparge device may be adapted to release gas bubbles into the vessel. Each impeller may include a plurality of blades spaced circumferentially about the shaft. Each impeller may define blade outer edges. Each funnel assembly may be positioned underneath a respective impeller of the plurality of impellers. Each funnel assembly may include a downwardly-oriented funnel defining a topside, an underside, and a substantially circular lower edge, a disc attached to the shaft such that the disc rotates with the impellers, and a channel extending radially inward from a location near the cylindrical sidewall. The disc may be oriented substantially perpendicularly to the shaft. The disc may be located at the lower edge of the funnel, such that gas bubbles rising to contact the disc are directed around the lower edge and onto the underside of the funnel. The channel may penetrate through the funnel to an interior of the funnel. The channel may be adapted to direct gas bubbles from the cylindrical sidewall to a location near the blade outer edges of the respective impeller. The lower edge of the funnel and the disc may define a lower gap therebetween, such that solid particles falling from within the funnel are directed out of the lower gap when the disc is rotated.

The system may include three redistribution funnel assemblies. Each funnel may define an angle relative to a horizontal axis perpendicular to the shaft of between approximately 30° and 75°. The bottom of the vessel may have a conical shape. The plurality of impellers may be radial flow impellers. The system may further include an axial flow impeller located below the sparge device, the axial impeller adapted to prevent an accumulation of solid particles at the bottom of the vessel. The system may further include a pocket extending circumferentially around the underside of each funnel adjacent to the cylindrical sidewall of the vessel, each pocket adapted to coalesce gas bubbles that rise upwards along the underside of its funnel. Each funnel assembly may include three channels. Each channel may be adapted to direct gas bubbles from the cylindrical sidewall to a location within 10% of the vessel diameter from the blade outer edges of the respective impeller of its funnel assembly. The shaft may be oriented substantially parallel to a longitudinal axis of the vessel. The disc may define a diameter that is substantially equal to a diameter of the lower edge of the funnel. The system may further include a solids return line that is adapted to recycle solid particles that exit through the bottom of the vessel back into the vessel above the plurality of redistribution funnel assemblies. Each funnel may define a conical frustum shape. The system may further include a feed tank for supplying magnesium enriched lime scrubber feed slurry containing calcium sulfite hemihydrate to the vessel, a gas compressor for providing compressed air to the vessel, a pH regulator for regulating pH in the vessel, and an outlet container for receiving discharge slurry containing gypsum crystals from the vessel.

A method of forming solid crystals includes the steps of inserting a liquid into a vessel defining a longitudinal axis and cylindrical sidewall, inserting gas bubbles into a lower portion of the vessel through a sparge device outlet, the gas bubbles having an average bubble size, rotating an impeller assembly about the longitudinal axis, the impeller assembly including a first impeller located in a first mixing cell and a second impeller located in a second mixing cell above the first mixing cell, the rotation of the first impeller reducing the average bubble size relative to the average bubble size at the sparge device outlet, coalescing the gas bubbles in a pocket extending circumferentially around an underside of a funnel adjacent to the cylindrical sidewall of the vessel such that the average gas bubble size is increased relative to the average bubble size at the first impeller, directing the coalesced gas bubbles from the pocket toward the second impeller, and rotating the second impeller such that the average gas bubble size is reduced relative to the average bubble size at the pocket. Each impeller may include a plurality of blades spaced circumferentially about the shaft.

The step of directing the coalesced gas bubbles from the pocket toward the second impeller may include directing the coalesced gas bubbles along a channel extending radially inward from a location near the cylindrical sidewall. The second impeller may define blade outer edges, and the step of directing the coalesced gas bubbles from the pocket toward the second impeller may include directing the coalesced gas bubbles toward a location near the blade outer edges of the second impeller. The first impeller may reduce the average bubble size relative to the average bubble size at the sparge device outlet by contacting the bubbles, and the second impeller may reduce the average bubble size relative to the average bubble size at the pocket by contacting the bubbles The gas bubbles may be air bubbles including oxygen. The method may further include the steps of directing the coalesced gas bubbles into a third mixing cell of the liquid located above the second mixing cell, and directing the coalesced gas bubbles into a fourth mixing cell of the liquid located above the third mixing cell.

The method may further include the steps of reacting a first group of molecules with the gas bubbles in the second mixing cell to produce a second group of molecules, crystallizing the second group of molecules into solid particles defining an average particle size, precipitating the solid particles down onto a disc attached to the shaft and located beneath a lower edge of the funnel, rotating the disc to direct the solid particles out of the funnel and into the first mixing cell, increasing the average particle size of the solid particles relative to the average particle size in the first mixing cell, and removing the solid particles from the vessel. The first group of molecules may include calcium sulfite hemihydrate and the second group of molecules may include gypsum. The method may further include the steps of reacting a third group of molecules with the gas bubbles in a third mixing cell of the liquid located above the second mixing cell to produce a fourth group of molecules, crystallizing the fourth group of molecules into solid particles, reacting a fifth group of molecules with the gas bubbles in a fourth mixing cell of the liquid located above the third mixing cell to produce a sixth group of molecules, and crystallizing the sixth group of molecules into solid particles.

These and various other advantages and features are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there are illustrated and described preferred embodiments of the invention.

DETAILED DESCRIPTION OF ILLUSTRATIVE EMBODIMENTS

Figure 1:
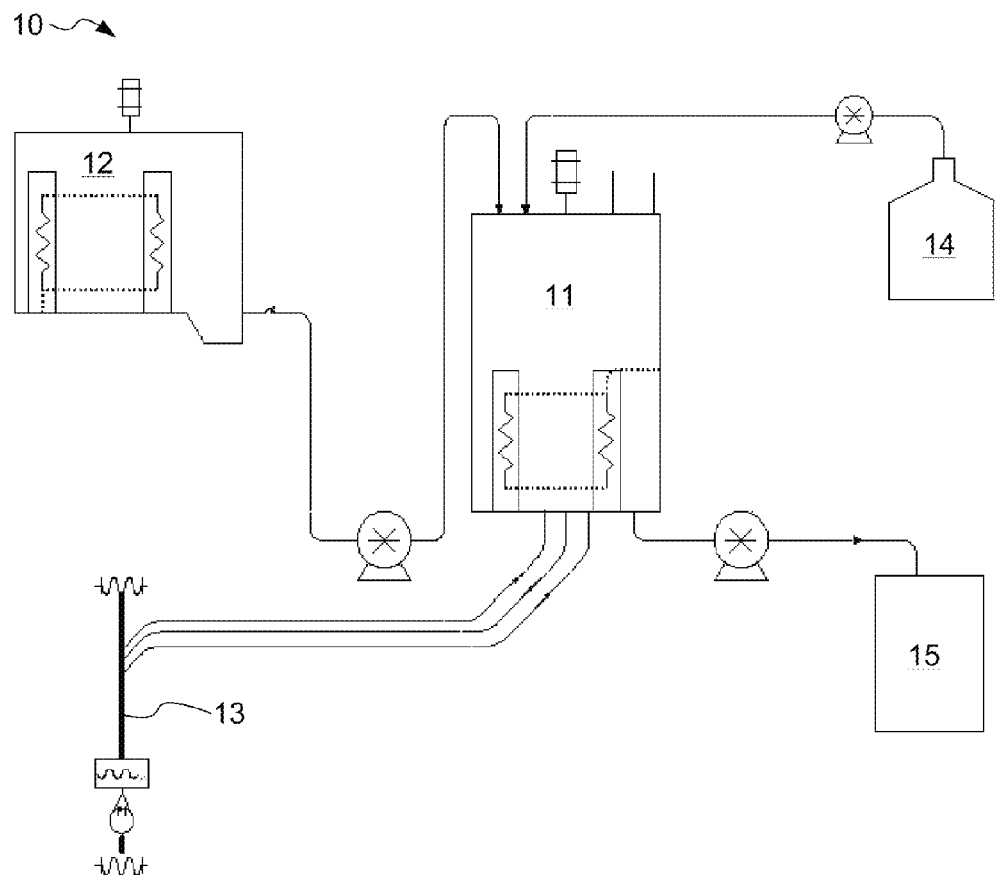
FIG. 1 is a diagrammatic view of an ex situ oxidation and crystallization system.

Referring to FIG. 1, an ex situ oxidation and crystallization system 10 includes a crystallizer 11 for oxidation of calcium sulfite hemihydrate to produce gypsum crystals, a feed tank 12 that supplies calcium sulfite hemihydrate to crystallizer 11, a gas source 13 for providing oxygen to react with the calcium sulfite hemihydrate, a pH regulator 14, and an outlet container 15 for collecting gypsum crystals precipitated out of the crystallizer 11.

Feed tank 12 preferably supplies magnesium enriched lime scrubber feed slurry to crystallizer 11 by a positive displacement pump. Gas source 13 provides compressed air to crystallizer 11. The pH regulator 14 measures the pH in crystallizer 11 and is adapted to maintain the pH in crystallizer 11 by introducing acid into crystallizer 11 as needed. If the pH in crystallizer 11 is too low, the pH can be increased by adding hydroxide to feed tank 12 as needed. Preferably, the pH in crystallizer 11 should remain between 5.0 and 5.8. Outlet container 15 receives the discharge slurry from crystallizer 11 containing gypsum. Outlet container 15 includes a positive displacement pump for receiving discharge slurry containing gypsum and maintaining the level of liquid or slurry in crystallizer 11.

In an example embodiment (example 1), feed tank 12 supplies calcium sulfite slurry to crystallizer 11 at a feed rate of up to 280 gallons per minute (GPM), gas source 13 supplies air to crystallizer 11 at a federate of up to 8600 standard cubic feet per minute (SCFM), and crystallizer 11 provides gypsum crystals to outlet container 15 having D50 of 50-microns or less and a average aspect ratio of less than or equal to 2:1.

Figure 2:
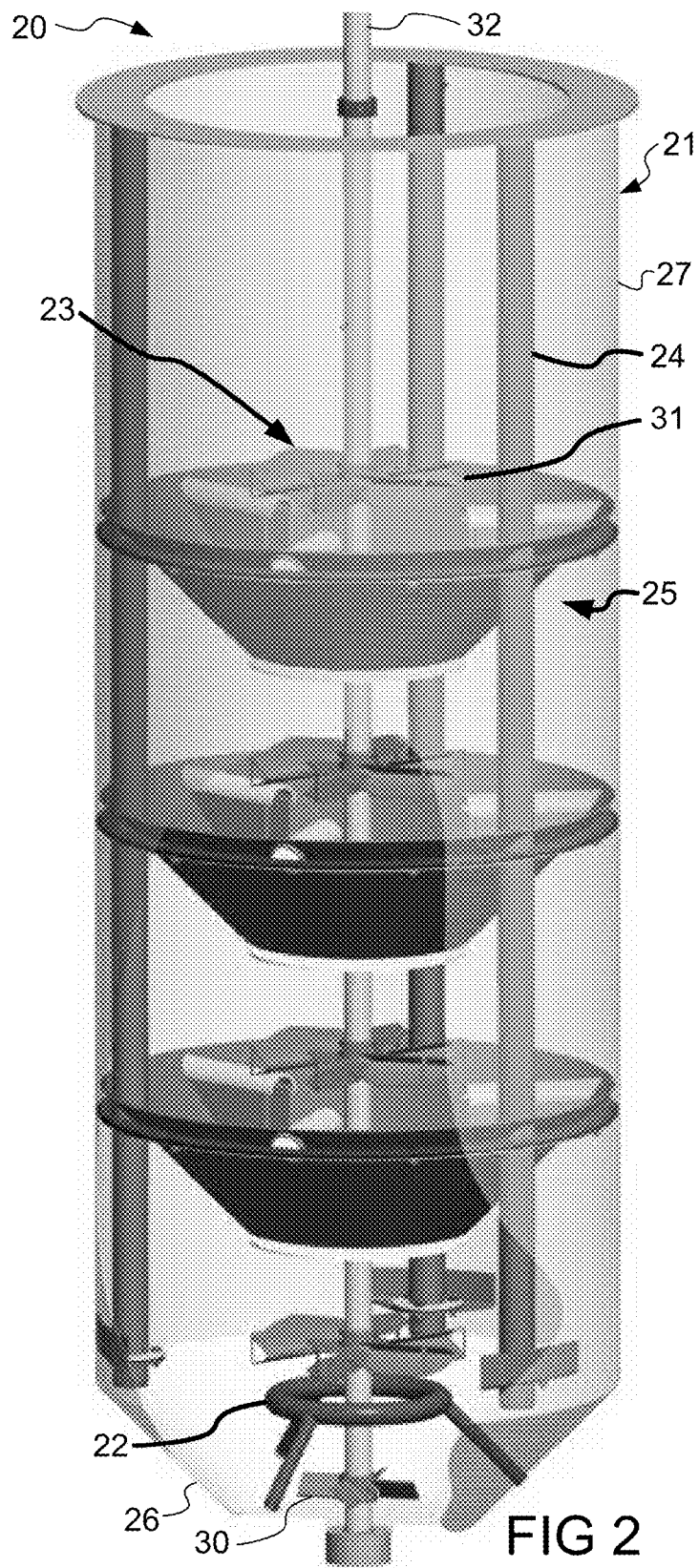
FIG. 2 is an upper perspective view of a first embodiment crystallizer suitable for use in the system depicted in FIG. 1.

Referring to FIG. 2, a first embodiment crystallizer 20 suitable for use in ex situ oxidation and crystallization system 10 includes a vessel 21 for containing a liquid or slurry, a sparge device 22 for introducing gas bubbles (preferably air bubbles containing oxygen) into vessel 21, an impeller assembly 23 for breaking up gas bubbles and agitating the liquid in vessel 21, baffles 24 for preventing or reducing rotation of the liquid in vessel 21, and redistribution cone or funnel assemblies 25 for controlling the flow of air and solids through vessel 21.

Vessel 21 may have any size and aspect ratio, including for example, a diameter of 30 feet and a height of 50 feet (example 1). Vessel 21 has a bottom 26 and a cylindrical sidewall 27. Although bottom 26 has a conical shape, bottom 26 of vessel 21 may have other shapes, including for example, a flat bottom (shown in FIGS. 4A and 4B). Vessel preferably is made of a carbon steel shell with a rubber or neoprene liner along the inside of cylindrical sidewall 27.

Sparge device 22 preferably is a conventional sparge ring for introducing gas bubbles into vessel 21. In other embodiments, other sparge devices may be used, including for example, a sparge pipe or a plurality of sparge pipes such as 2, 3, 4, or 6 pipes. Sparge device 22 may have any diameter relative to the diameter of vessel 21. Preferably, sparge device 22 has a diameter that is between 50% and 90% of the diameter of vessel 21, more preferably approximately 80% of the diameter of vessel 21. In a preferred embodiment, sparge device 22 can release gas into vessel 21 with flow rates of 5, 10, and 14 standard cubic feet per minute (SCFM), depending on the density of the slurry in vessel 21. In a preferred embodiment, the volume per minute of compressed gas provided to sparge device 22 for creation of gypsum crystals in vessel 21 is approximately half that required in a conventional gypsum crystallizer, which permitted the air compressor that supplies air to sparge device 22 to be reduced from a 3500 hp unit to a 1750 hp unit. In an exemplary embodiment, volume per minute of oxygen provided by sparge device 22 in vessel 21 is approximately 1.5 times the oxygen needed for oxidation of the calcium sulfite hemihydrate, compared to a conventional crystallizer that typically requires 3.0 times the oxygen needed for oxidation to be sparged into the crystallizer.

Impeller assembly 23 includes a lower impeller 30 for keeping gypsum crystals in suspension in a liquid contained in vessel 21, one or more upper impellers 31 for dispersing gas coming out of sparge device 22 and breaking up coalesced gas bubbles, and a shaft 32 for coupling the impellers 30 and 31 to a motor that is adapted to rotate shaft 32 and impellers 30 and 31. As shown in FIG. 2, there preferably are four upper impellers 31.

Lower impeller 30 preferably is an axial impeller located vertically below sparge device 22. For example, in one exemplary embodiment, lower impeller 30 is a Philadelphia Mixing Solutions 3MHS39 axial flow impeller, having blades that are pitched at approximately a thirty-nine (39) degree angle from a plane that is perpendicular to the rotational axis of lower impeller 30. In other embodiments, lower impeller 30 can be another type of impeller, including for example, a rushton turbine. The diameter of lower impeller 30 preferably is less than the diameter of sparge device 22, such that the entire lower impeller 30 does not radially extend beyond the outer diameter of sparge device 22. Lower impeller 30 preferably is adapted to prevent an accumulation of solid particles at bottom 26 of vessel 21.

Upper impellers 31 preferably are radial impellers located vertically above sparge device 22. For example, in one exemplary embodiment, upper impellers 31 are Philadelphia Mixing Solutions GDX radial flow impellers, having blades with a rearward rake angle that are described in U.S. Patent Application Publication no. 2009/0231952, which is herein incorporated by reference in its entirety. In other embodiments, each upper impeller 31 can be another type of impeller, including for example, a rushton turbine. The diameter of upper impellers 31 preferably are equal to or greater than the diameter of sparge device 22. The diameter of upper impellers 31 preferably are between 25% and 50% of the diameter of vessel 21. Preferably, each upper impeller 31 can provide complete mixing of air bubbles and calcium sulfite particles in the slurry in vessel 21, so that pockets of relatively high gypsum saturation are reduced or eliminated. In an example embodiment upper impellers 31 are rotated at speeds up to 350 rpm.

Baffles 24 extend vertically along cylindrical sidewall 27 of vessel 21. Baffles 24 preferably extend from bottom 26 to the anticipated surface of the liquid to be contained in vessel 21. Baffles 24 are adapted to prevent or reduce rotation of the liquid in vessel 21. Although baffles 24 have a circular cross-section, the cross-section of baffles 24 may have other shapes, including for example, a flat plate cross-section (shown in FIG. 5). Baffles 24 may be omitted in some embodiments (shown in FIGS. 4A and 4B). Although there are three baffles 24 shown in FIG. 2, in other embodiments, there may be other numbers of baffles 24. For example, in FIG. 5, there are two baffles.

Redistribution cone or funnel assemblies 25 are vertically spaced apart along cylindrical sidewall 27, and each cone assembly 25 is positioned vertically below an upper impeller 31 for dispersing the gas bubbles channeled into cone assembly 25. Although there are three cone assemblies 25 shown in FIG. 2, in other embodiments, there may be other number of cone assemblies 25, depending on desired performance characteristics of the crystallizer, such as the desired molecules to be oxidized and crystallized, the desired precipitated crystal size, the desired crystal residence time in the crystallizer.

Figure 3A:
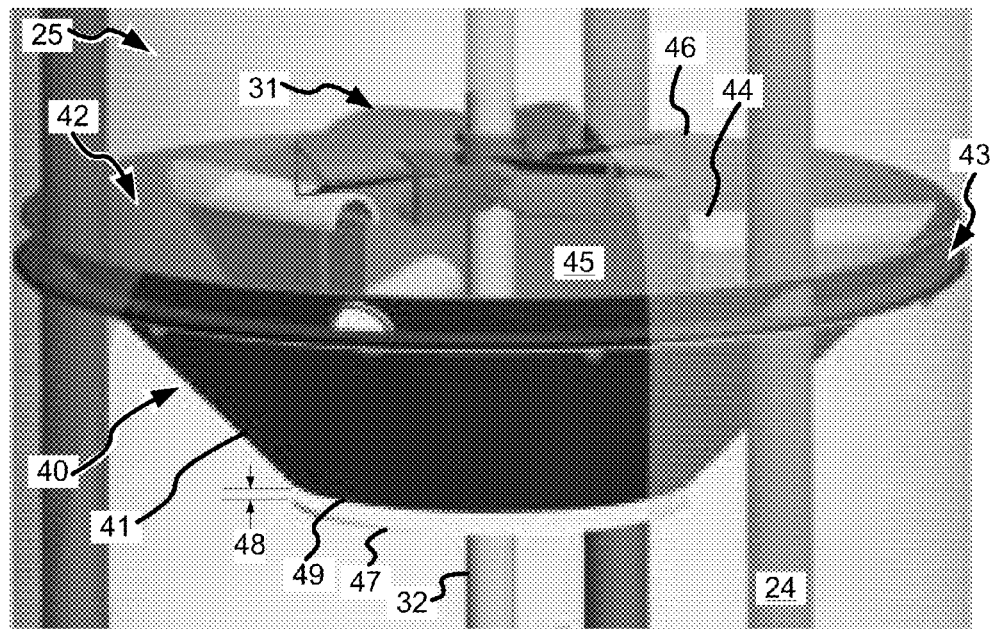
FIG. 3A is an enlarged upper perspective view of a redistribution cone assembly depicted in FIG. 2.
Figure 3B:
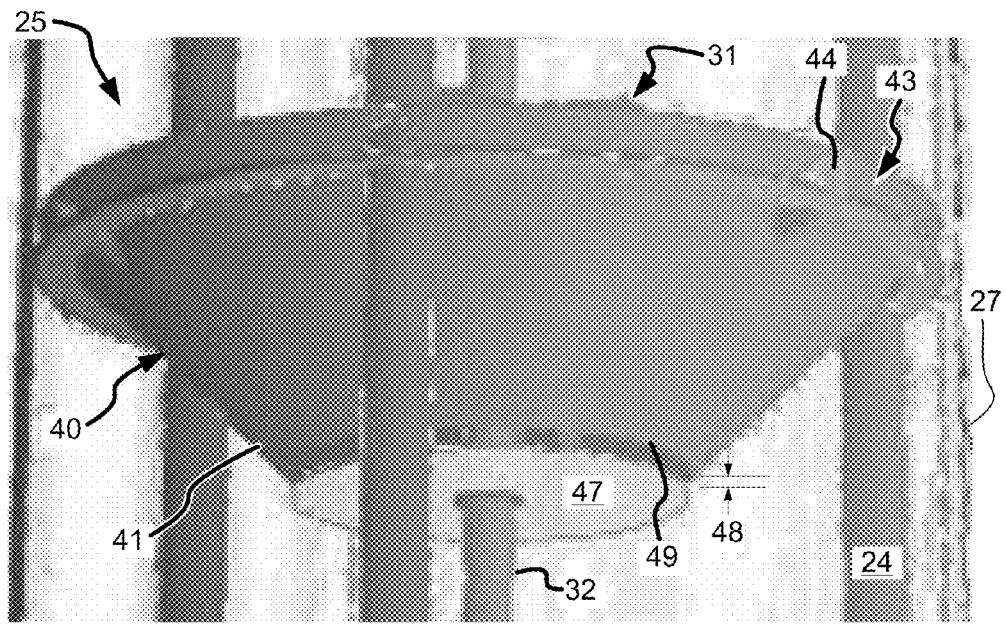
FIG. 3B is a lower perspective view of the redistribution cone assembly depicted in FIG. 3A.

Referring to FIGS. 3A and 3B, each redistribution cone assembly 25 includes a cone or funnel 40 for directing gas bubbles upward along an underside 41 of cone 40 and directing precipitating solids downward along a topside 42 of cone 40, a pocket 43 extending circumferentially around underside 41 of cone 40 for coalescing gas bubbles rising along underside 41 of cone 40, channels 44 for directing gas bubbles from respective pockets 43 to an interior 45 of cone 40 near outer edges 46 of an adjacent upper impeller 31 that is positioned vertically above cone 40, and rotating disc 47 for directing precipitating solids out of cone 40 via a lower gap 48 located between rotating disc 47 and a lower edge 49 of cone 40.

Cone or funnel 40 has a conical frustum shape, such that topside 42 of cone 40 preferably defines an angle relative to a horizontal axis perpendicular to shaft 32 of between approximately 30° to 75°, such that gravity will pull precipitated crystals down topside 42 of cone 40 toward rotating disc 47, thereby preventing accumulation of solids on topside 42. Cone 40 is configured such that gas bubbles underneath cone 40 will be directed by underside 41 of cone 40 toward pocket 43. Although cone 40 is shown in the Figures as having a conical frustum shape, any funnel or funnel-type shape may be used, including for example, a funnel that resembles a conical frustum shape that has its sides bowed radially inward or outward, such that the slope of the sides of the funnel varies from the top to the bottom of the funnel, a pyramidal frustum, or a spherical segment (i.e., a shape defined by cutting a hollow sphere with parallel planes).

Once gas bubbles reach pocket 43, channels 44 are configured to direct gas bubbles from pocket 43 toward interior 45 of cone 40. Preferably, channels 44 extend radially inward from pocket 43 to a location near outer edges 46 of an adjacent upper impeller 31 that is positioned above cone 40, such that gas bubbles from pocket 43 are directed to be released in interior 45 of cone 40 near outer edges 46. For example, if the diameter of impellers 31 are approximately 40% of the diameter of vessel 21, such that outer edges 46 are located approximately 40% of the distance from shaft 32 to cylindrical sidewall 27, channels 44 may extend inward to a location that is between 30% and 50% of the distance from shaft 32 to cylindrical sidewall 27. In other embodiments, channels 44 extend radially inward from pocket 43 at cylindrical sidewall 27 to a location within 2%, 5%, 10%, 15%, or 20% of the diameter of vessel 21 from outer edges 46 of impellers 31, such that channels 44 are adapted to direct gas bubbles from pocket 43 at cylindrical sidewall 27 to a location within 2%, 5%, 10%, 15%, or 20% of the diameter of vessel 21 from outer edges 46 of impellers 31. Preferably, channels 44 extend radially inward from pocket 43 to a location as close as possible to outer edges 46 of impellers 31, taking into account conventional manufacturing tolerances. It is believed that the portion of the slurry near outer edges 46 of each impeller 31 is a region of high shear that can most efficiently disperse coalesced air bubbles into very small air bubbles, so directing coalesced bubbles toward outer edges 46 of each impeller 31 may improve the mass transfer rate of oxygen to the slurry. Although there are three channels 44 shown in FIG. 3A, in other embodiments, the redistribution cone assemblies may have any number of air-directing channels.

Rotating disc 47 is attached to shaft 32 and rotates with impellers 30 and 31. Rotating disc 47 preferably is positioned concentrically about the same longitudinal axis as cone 40. Rotating disc 47 preferably has a diameter that is substantially equal to the diameter of lower edge 49 of cone 40 (i.e., the diameter of rotating disc 47 is the same, slightly less, or slightly greater that the diameter of lower edge 49 of cone 40), such that gas bubbles rising toward lower edge 49 of cone 40 will be deflected by rotating disc 47 onto underside 41 of cone 40, thereby mostly or entirely preventing rising gas bubbles from entering interior 45 of cone 40. In embodiments where the diameter of rotating disc 47 is slightly less than the diameter of lower edge 49 of cone 40, the rotation of rotating disc 47 may help direct rising gas bubbles onto underside 41 of cone 40, rather than allowing gas bubbles to enter interior 45 of cone 40. Preventing gas bubbles rising toward lower edge 49 of cone 40 from entering interior 45 of cone 40 may reduce intermix between the mixing cells, which will be described below with reference to FIGS. 4A and 4B.

Once precipitating solids slide downward along topside 42 of cone 40, the solids contact rotating disc 47. Rotating disc 47 is separated from lower edge 49 of cone 40 by lower gap 48. Lower gap 48 is configured such that the centrifugal force acting on precipitated solids contacting rotating disc 47 ejects the precipitated solids out of cone 40 through lower gap 48, where the precipitated solids can fall downward toward the next lower redistribution cone assembly 25. The size of lower gap 48 (i.e., the vertical distance between rotating disc 47 and lower edge 49 of cone 40) may be adjusted to reduce or increase the distance between rotating disc 47 and lower edge 49 of cone 40, which may control the rate that solids pass downward through each redistribution cone assembly 25.

Figures 4A, 4B:
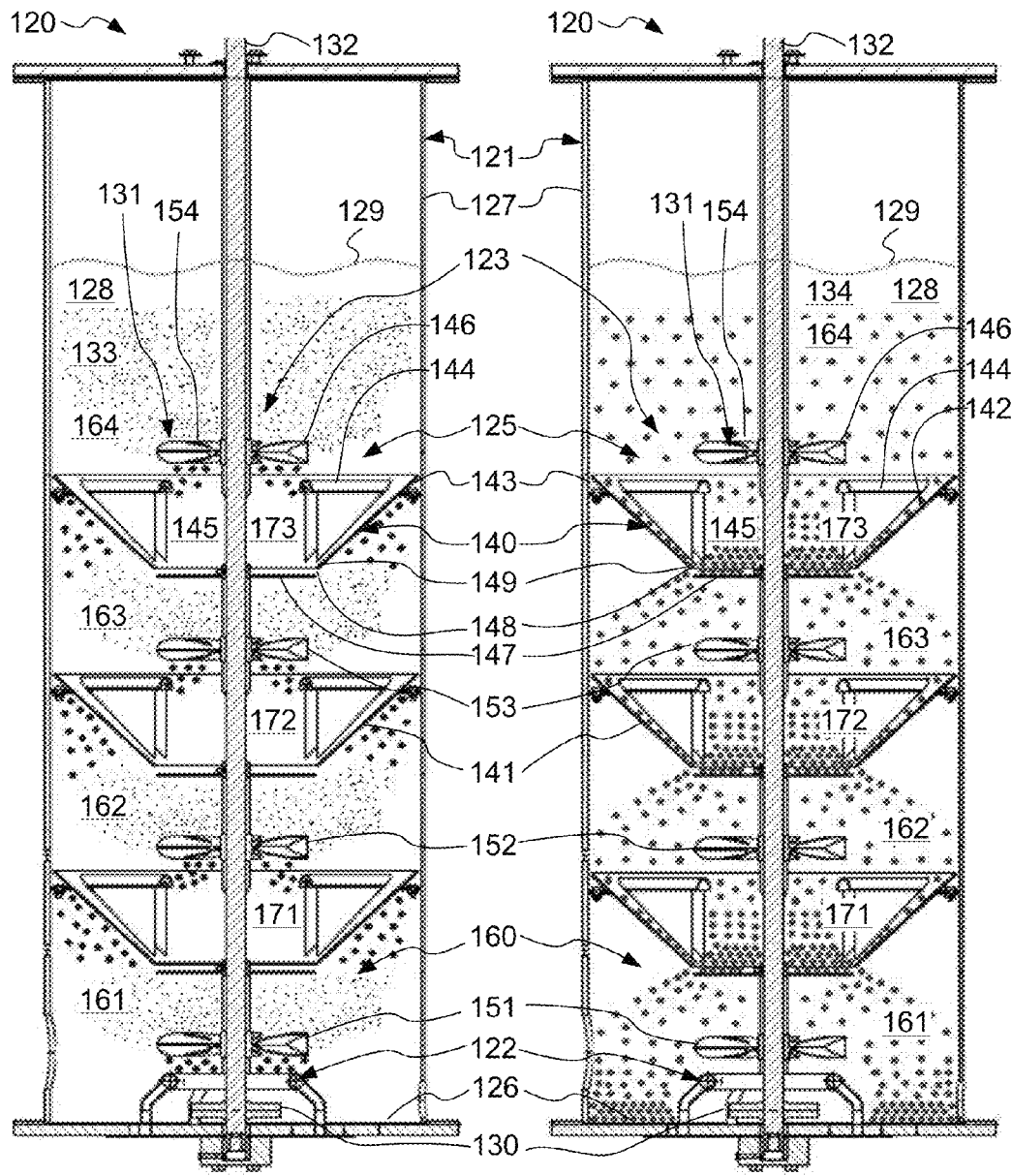
FIG. 4A is a side cross-sectional view of a second embodiment crystallizer suitable for use in the system depicted in FIG. 1, illustrating the upward air flow through the liquid.
FIG. 4B is a side cross-sectional view of the crystallizer depicted in FIG. 4A, illustrating the downward solids flow through the liquid.

Referring to FIGS. 4A and 4B, a second embodiment crystallizer 120 suitable for use in ex situ oxidation and crystallization system 10 includes a vessel 121 for containing a liquid or slurry, a sparge device 122 for introducing gas bubbles 133 into vessel 121, an impeller assembly 123 for breaking up gas bubbles 133 and agitating the liquid in vessel 121, and redistribution cone assemblies 125 for controlling the flow of gas 133 and solids 134 through vessel 121. In a preferred embodiment, gas bubbles 133 are air bubbles including oxygen.

Vessel 121 has a bottom 126 and a cylindrical sidewall 127. Although bottom 126 has a flat shape, bottom 126 of vessel 121 may have other shapes, including for example, a conical bottom (shown in FIG. 2). Vessel 121 contains a liquid or slurry 128 having a surface 129. Slurry 128 preferably contains calcium sulfite hemihydrate that can be oxidized and crystallized to produce gypsum. In a preferred embodiment, surface 129 of slurry 128 is located approximately at 80% of the height of vessel 121 (i.e., 80% of the distance from bottom 126 of vessel 121 to the top of vessel 121). Preferably, slurry 128 contains between 15% and 35% density of solids 134 by weight. In one exemplary embodiment, slurry 128 contains between 15% and 25% density of solids 134 by weight. In another exemplary embodiment, slurry 128 contains between 27% and 33% density of solids 134 by weight.

Impeller assembly 123 includes a lower impeller 130 for keeping gypsum crystals in suspension in a liquid contained in vessel 121, one or more upper impellers 131 for dispersing gas 133 coming out of sparge device 122 and breaking up coalesced gas bubbles 133, and a shaft 132 for coupling the impellers 130 and 131 to a motor that is adapted to rotate shaft 132 and impellers 130 and 131.

Each redistribution cone assembly 125 includes a cone 140 for directing gas bubbles 133 upward along an underside 141 of cone 140 and directing precipitating solids 134 downward along a topside 142 of cone 140, a pocket 143 extending circumferentially around underside 141 of cone 140 for coalescing gas bubbles 133 rising along underside 141 of cone 140, channels 144 for directing gas bubbles 133 from respective pockets 143 to an interior 145 of cone 140 near outer edges 146 of an adjacent upper impeller 131 that is positioned vertically above cone 140, and rotating disc 147 for directing precipitating solids 134 out of cone 140 via a lower gap 148 located between rotating disc 147 and a lower edge 149 of cone 140.

As shown in FIGS. 4A and 4B, crystallizer 120 has four upper impellers 131, including first upper impeller 151, second upper impeller 152, third upper impeller 153, and fourth upper impeller 154. Each upper impeller 131 is positioned in a respective mixing cell 160 for dissolving oxygen into slurry 128 and reacting oxygen with calcium sulfite hemihydrate in slurry 128 to form gypsum crystals. There preferably are four mixing cells 160, including first cell 161, second cell 162, third cell 163, and fourth cell 164.

As shown in FIG. 4A, gas bubbles 133 enter first cell 161 via sparge device 122 located near bottom 126 of vessel 121. Bottom impeller 130 is located below sparge device 122 and may help move gas bubbles 133 from sparge device 122 to first upper impeller 151. First upper impeller 151 is located above sparge device 122 and is adapted to disperse gas bubbles throughout slurry 128 within first cell 161. Preferably, air bubbles 133 located in first cell 161 are the most oxygen-rich air bubbles 133 in vessel 121, because the oxygen is gradually dissolved from air bubbles 133 into slurry 128 to react with calcium sulfite hemihydrate to form gypsum crystals, as the air bubbles travel from bottom 126 of vessel 121 to slurry surface 129. Preferably, air bubbles 133 are broken up into very small air bubbles that are at least somewhat evenly spaced throughout first cell 161 to maximize mass transfer of oxygen from air bubbles 133 into slurry 128, which may promote sulfite oxidation to take place throughout more of slurry 128 than in a conventional gypsum crystallizer.

As air bubbles 133 reach the top of first cell 161, they contact a rotating disc 147 and an underside 141 of a cone 140 of a first redistribution cone assembly 171. Small air bubbles 133 are guided by rotating disc 147 toward underside 141 of cone 140, around lower gap 148. Preferably, each rotating disc 147 mostly separates each respective cell 160 from the adjacent mixing cell 160, such that intermixing of air bubbles 133 between cells 160 is reduced or substantially eliminated.

Small air bubbles 133 coalesce into larger air bubbles 133 as they move upward along underside 141 of cone 140, until air bubbles 133 reach pocket 143 of first redistribution cone assembly 171. Air bubbles 133 travel from pocket 143 through channel 144 toward outer edges 146 of second upper impeller 152, where air bubbles 133 are released below outer edges 146 of second upper impeller 152.

Second upper impeller 152 is located above first redistribution cone assembly 171 and is adapted to disperse air bubbles throughout slurry 128 within second cell 162. Air bubbles 133 located in second cell 162 are somewhat less oxygen-rich than air bubbles 133 located in first cell 161, because additional oxygen is dissolved from air bubbles 133 into slurry 128 to react with calcium sulfite hemihydrate to form gypsum crystals, as the air bubbles travel to each successive cell 161, 162, 163, and 164. Preferably, coalesced air bubbles 133 that are emitted from channel 144 of first redistribution cone assembly 171 are again broken up into very small air bubbles by second impeller 152. Again, air bubbles 133 preferably are at least somewhat evenly spaced throughout second cell 162 to maximize mass transfer of oxygen from air bubbles 133 into slurry 128.

As air bubbles 133 reach the top of second cell 162, they contact a rotating disc 147 and an underside 141 of a cone 140 of a second redistribution cone assembly 172. Small air bubbles 133 are guided by rotating disc 147 toward underside 141 of cone 140, around lower gap 148. Small air bubbles 133 coalesce into larger air bubbles 133 as they move upward along underside 141 of cone 140, until air bubbles 133 reach pocket 143 of second redistribution cone assembly 172. Air bubbles 133 travel from pocket 143 through channel 144 toward outer edges 146 of third upper impeller 153, where air bubbles 133 are released below outer edges 146 of third upper impeller 153.

Third upper impeller 153 is located above second redistribution cone assembly 172 and is adapted to disperse air bubbles throughout slurry 128 within third cell 163. Air bubbles 133 located in third cell 163 are somewhat less oxygen-rich than air bubbles 133 located in second cell 162 and first cell 161. Preferably, coalesced air bubbles 133 that are emitted from channel 144 of second redistribution cone assembly 172 are again broken up into very small air bubbles by third impeller 153. Again, air bubbles 133 preferably are at least somewhat evenly spaced throughout third cell 163 to maximize mass transfer of oxygen from air bubbles 133 into slurry 128.

As air bubbles 133 reach the top of third cell 163, they contact a rotating disc 147 and an underside 141 of a cone 140 of a third redistribution cone assembly 173. Small air bubbles 133 are guided by rotating disc 147 toward underside 141 of cone 140, around lower gap 148. Small air bubbles 133 coalesce into larger air bubbles 133 as they move upward along underside 141 of cone 140, until air bubbles 133 reach pocket 143 of third redistribution cone assembly 173. Air bubbles 133 travel from pocket 143 through channel 144 toward outer edges 146 of fourth upper impeller 154, where air bubbles 133 are released below outer edges 146 of fourth upper impeller 154.

Fourth upper impeller 154 is located above third redistribution cone assembly 173 and is adapted to disperse air bubbles throughout slurry 128 within fourth cell 164. Air bubbles 133 located in fourth cell 164 are the least oxygen-rich air bubbles 133, compared to the air bubbles 133 located in cells 161, 162, and 163. Preferably, coalesced air bubbles 133 that are emitted from channel 144 of third redistribution cone assembly 173 are again broken up into very small air bubbles by fourth impeller 154. Again, air bubbles 133 preferably are at least somewhat evenly spaced throughout fourth cell 164 to maximize mass transfer of oxygen from air bubbles 133 into slurry 128. After air bubbles 133 are mixed into slurry 128 by fourth upper impeller 154, air bubbles 133 are emitted from slurry 128 at surface 129, where the air above surface 129 may be vented out of vessel 121.

As shown in FIG. 4B, solids 134 are created in fourth cell 164 when a liquor containing calcium sulfite hemihydrate reacts with the oxygen in air bubbles 133. Although air bubbles 133 in fourth cell 164 are relatively oxygen-depleted compared to the oxygen-rich air bubbles 133 in first cell 161, the oxygen in air bubbles 133 in fourth cell 164 is sufficient to begin to crystallize solids 134 by reacting with the calcium sulfite hemihydrate. The liquor containing calcium sulfite hemihydrate enters fourth cell 164 via an inlet (shown in FIG. 5) located above third redistribution cone assembly 173.

As solids 134 begin to crystallize in fourth cell 164, solids 134 begin to precipitate downward towards third redistribution cone assembly 173. Solids 134 gradually precipitate onto topside 142 of cone 140 and onto rotating disc 147. As solids 134 precipitate onto topside 142 of cone 140, gravity causes solids 134 to slide downward along topside 142 of cone 140 until solids 134 fall onto rotating disc 147. The centrifugal force from the rotation of rotating disc 147 directs solids 134 out of cone 140 through lower gap 148 and into the top of third cell 163. Preferably, each rotating disc 147 mostly separates each respective cell 160 from the adjacent mixing cell 160, such that intermixing of solids 134 between cells 160 is reduced or substantially eliminated.

After solids 134 are directed into the top of third cell 163, solids 134 react with the oxygen in air bubbles 133. Compared to the oxygen-depleted air bubbles 133 in fourth cell 164, air bubbles 133 in third cell 163 are more oxygen-rich. The oxygen in air bubbles 133 in third cell 163 permits solids 134 to grow into larger gypsum crystals.

As solids 134 grow into larger gypsum crystals in third cell 163, solids 134 begin to precipitate downward towards second redistribution cone assembly 172. Solids 134 gradually precipitate onto topside 142 of cone 140 and onto rotating disc 147. As solids 134 precipitate onto topside 142 of cone 140, gravity causes solids 134 to slide downward along topside 142 of cone 140 until solids 134 fall onto rotating disc 147. The centrifugal force from the rotation of rotating disc 147 directs solids 134 out of cone 140 through lower gap 148 and into the top of second cell 162.

After solids 134 are directed into the top of second cell 162, solids 134 react with the oxygen in air bubbles 133. Air bubbles 133 in second cell 162 are more oxygen-rich than air bubbles 133 in fourth cell 164 and third cell 163. The oxygen in air bubbles 133 in second cell 162 permits solids 134 to grow into even larger gypsum crystals.

As solids 134 grow into larger gypsum crystals in second cell 162, solids 134 begin to precipitate downward towards first redistribution cone assembly 171. Solids 134 gradually precipitate onto topside 142 of cone 140 and onto rotating disc 147. As solids 134 precipitate onto topside 142 of cone 140, gravity causes solids 134 to slide downward along topside 142 of cone 140 until solids 134 fall onto rotating disc 147. The centrifugal force from the rotation of rotating disc 147 directs solids 134 out of cone 140 through lower gap 148 and into the top of first cell 161.

After solids 134 are directed into the top of first cell 161, solids 134 react with the oxygen in air bubbles 133. Air bubbles 133 in first cell 161 are more oxygen-rich than air bubbles 133 in cells 164, 163, and 162. The oxygen in air bubbles 133 in first cell 161 permits solids 134 to grow into even larger gypsum crystals.

When solids 134 precipitate downward towards bottom 126 of vessel 121, gypsum crystal solids 134 are removed from vessel 121 via an outlet (shown in FIG. 5) located at bottom 126 of vessel 121.

Although the embodiments shown have four mixing cells 160 separated by three redistribution cone assemblies 125, any number of mixing cells may be used, including, for example, two, three, five, six, seven, or eight mixing cells 160, each pair of mixing cells 160 separated by a respective redistribution cone assembly 125.

Figure 5:
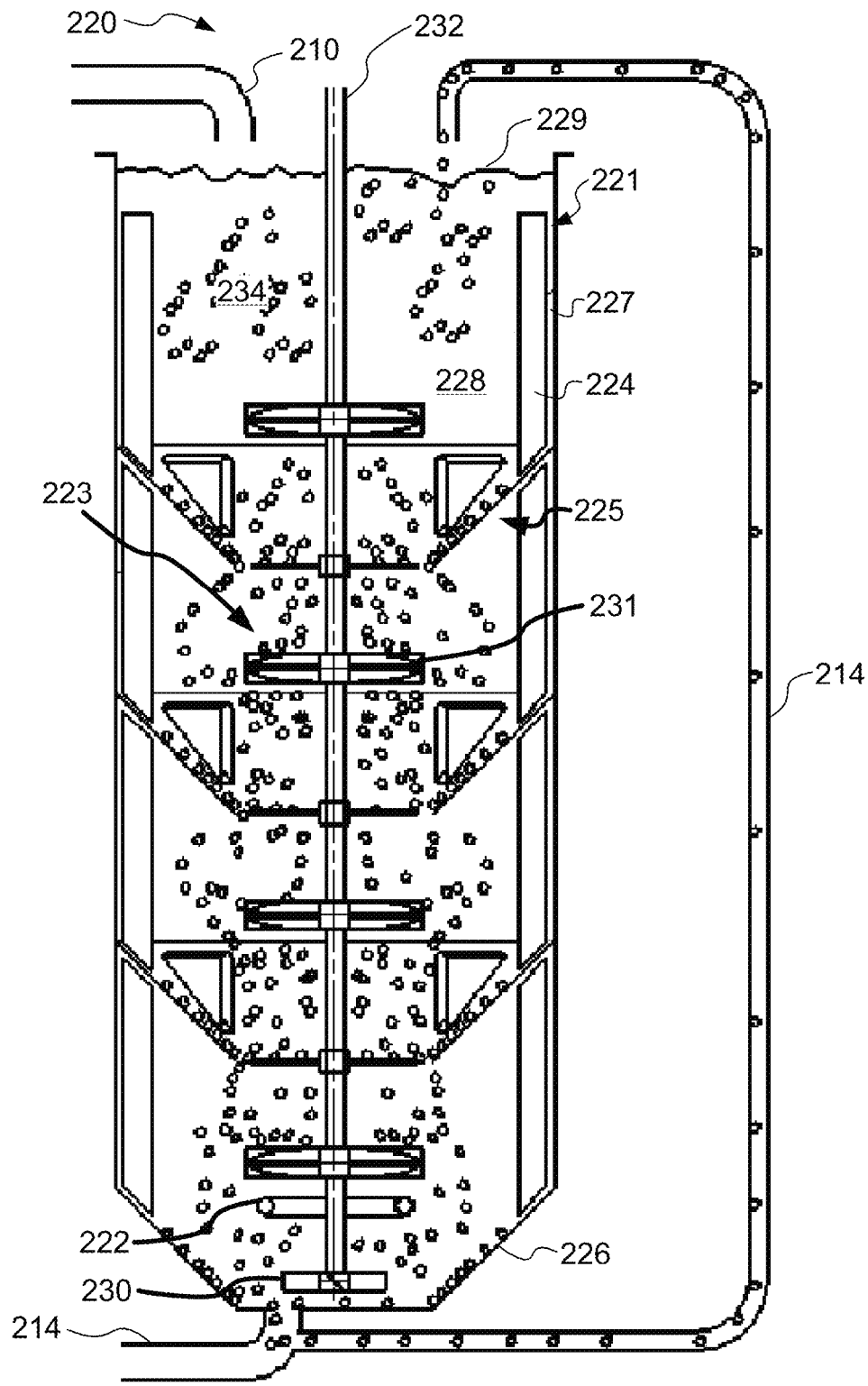
FIG. 5 is a side cross-sectional view of a third embodiment crystallizer suitable for use in the system depicted in FIG. 1, illustrating the downward solids flow through the liquid and the upward solids flow through the recycling conduit.

Referring to FIG. 5, a third embodiment crystallizer 220 suitable for use in ex situ oxidation and crystallization system 10 includes a vessel 221 for containing a liquid or slurry, a sparge device 222 for introducing air bubbles into vessel 221, an impeller assembly 223 for breaking up the air bubbles and agitating the liquid in vessel 221, baffles 224 for preventing or reducing rotation of the liquid in vessel 221, and redistribution cone assemblies 225 for controlling the flow of air and solids 234 through vessel 221. Vessel 221 has a conical bottom 226 and a cylindrical sidewall 227. Vessel 221 contains a liquid or slurry 228 having a surface 229. Slurry 228 preferably contains calcium sulfite hemihydrate that can be oxidized and crystallized to produce gypsum.

Impeller assembly 223 includes a lower impeller 230 for keeping gypsum crystals in suspension in a liquid contained in vessel 221, one or more upper impellers 231 for dispersing air coming out of sparge device 222 and breaking up coalesced air bubbles, and a shaft 232 for coupling the impellers 230 and 231 to a motor that is adapted to rotate shaft 232 and impellers 230 and 231.

Vessel 221 further includes an inlet 210 for introducing a liquor containing calcium sulfite hemihydrate into vessel 221, an outlet 212 located at bottom 226 of vessel 221 for removing formed gypsum crystal solids 234 from vessel 221, and a solids return line 214 for recycling some of the formed gypsum crystal solids 234 back into the top of vessel 221 to be used as seeds for generating additional solids 234.

Solids return line 214 may allow relatively small solids 234 that exit vessel 221 through outlet 212 to be returned to cycle again through vessel 221 so that the relatively small solids 234 grow larger before being sent, for example, to an outlet container such as outlet container 15 shown in FIG. 1. Using solids return line 214 to recycle smaller solids 234 back into vessel 221, so that the smaller solids 234 can be used as seeds to generate larger solids 234, may help prevent an excessively large portion of small crystals from being produced by crystallizer 220.

The liquor discharged from outlet 212 preferably does not exceed 500 mg/l soluble sulfite concentration, and the gypsum crystals discharged from outlet 212 preferably do not exceed 0.5% solid sulfites by weight. Preferably, solids 234 should remain in vessel 221 less than 6 hours before being discharged via outlet 212.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Further, several advantages have been described that flow from the structure and methods; the present invention is not limited to structure and methods that encompass any or all of these advantages. Those skilled in gypsum crystallization technology, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein. For example, any features or advantages related to the length and configuration of the channels relative to the blade outer edges of the impellers with respect to discussion of a particular crystallizer embodiment can be applicable to any of the other crystallizer embodiments described herein.

What is claimed:

1. A crystallizer system for forming solid crystals, comprising:
   a vessel defining a cylindrical sidewall;
   a sparge device located at a bottom of the vessel, the sparge device adapted to release gas bubbles into the vessel;
   an impeller assembly including a shaft and a plurality of impellers attached to the shaft, each impeller including a plurality of blades spaced circumferentially about the shaft; each impeller defining blade outer edges; and
   a plurality of redistribution funnel assemblies vertically spaced apart, each funnel assembly positioned underneath a respective impeller of the plurality of impellers, each funnel assembly including:
      a downwardly-oriented funnel defining a topside, an underside, and a substantially circular lower edge;
      a disc attached to the shaft such that the disc rotates with the impellers, the disc oriented substantially perpendicularly to the shaft, the disc located at the lower edge of the funnel, such that gas bubbles rising to contact the disc are directed around the lower edge and onto the underside of the funnel;
      the lower edge of the funnel and the disc define a lower gap therebetween, such that solid particles falling from within the funnel are directed out of the lower gap when the disc is rotated; and
      a channel extending radially inward from a location near the cylindrical sidewall, the channel penetrating through the funnel to an interior of the funnel, the channel adapted to direct gas bubbles from the cylindrical sidewall to a location near the blade outer edges of the respective impeller.

2. The system of claim 1, wherein there are three redistribution funnel assemblies.

3. The system of claim 1, each funnel defines an angle relative to a horizontal axis perpendicular to the shaft of between approximately 30° and 75°.

4. The system of claim 1, wherein the bottom of the vessel has a conical shape.

5. The system of claim 1, wherein the plurality of impellers are radial flow impellers.

6. The system of claim 1, further comprising an axial flow impeller located below the sparge device, the axial impeller adapted to prevent an accumulation of solid particles at the bottom of the vessel.

7. The system of claim 1, further comprising a pocket extending circumferentially around the underside of each funnel adjacent to the cylindrical sidewall of the vessel, each pocket adapted to coalesce gas bubbles that rise upwards along the underside of its funnel.

8. The system of claim 1, wherein each funnel assembly includes three channels.

9. The system of claim 1, wherein each channel is adapted to direct gas bubbles from the cylindrical sidewall to a location within 10% of the vessel diameter from the blade outer edges of the respective impeller of its funnel assembly.

10. The system of claim 1, wherein the shaft is oriented substantially parallel to a longitudinal axis of the vessel.

11. The system of claim 1, wherein the disc defines a diameter that is substantially equal to a diameter of the lower edge of the funnel.

12. The system of claim 1, further comprising a solids return line that is adapted to recycle solid particles that exit through the bottom of the vessel back into the vessel above the plurality of redistribution funnel assemblies.

13. The system of claim 1, wherein each funnel defines a conical frustum shape.

14. The system of claim 1, further comprising:
a feed tank for supplying magnesium enriched lime scrubber feed slurry containing calcium sulfite hemihydrate to the vessel;
a gas compressor for providing compressed air to the vessel;
a pH regulator for regulating pH in the vessel; and
an outlet container for receiving discharge slurry containing gypsum crystals from the vessel.

15. A method of forming solid crystals, comprising:
inserting a liquid into a vessel defining a longitudinal axis and cylindrical sidewall;
inserting gas bubbles into a lower portion of the vessel through a sparge device outlet, the gas bubbles having an average bubble size;
rotating an impeller assembly about the longitudinal axis, the impeller assembly including a first impeller located in a first mixing cell and a second impeller located in a second mixing cell above the first mixing cell, each impeller including a plurality of blades spaced circumferentially about a common shaft, the rotation of the first impeller reducing the average bubble size relative to the average bubble size at the sparge device outlet;
coalescing the gas bubbles in a pocket extending circumferentially around an underside of a funnel adjacent to the cylindrical sidewall of the vessel such that the average gas bubble size is increased relative to the average bubble size at the first impeller;
directing the coalesced gas bubbles from the pocket toward the second impeller; and
rotating the second impeller such that the average gas bubble size is reduced relative to the average bubble size at the pocket.

16. The method of claim 15, wherein the step of directing the coalesced gas bubbles from the pocket toward the second impeller includes directing the coalesced gas bubbles along a channel extending radially inward from a location near the cylindrical sidewall.

17. The method of claim 16, wherein the second impeller defines blade outer edges, and the step of directing the coalesced gas bubbles from the pocket toward the second impeller includes directing the coalesced gas bubbles toward a location near the blade outer edges of the second impeller.

18. The method of claim 15, wherein the first impeller reduces the average bubble size relative to the average bubble size at the sparge device outlet by contacting the bubbles, and the second impeller reduces the average bubble size relative to the average bubble size at the pocket by contacting the bubbles.

19. The method of claim 15, wherein the gas bubbles are air bubbles including oxygen.

20. The method of claim 15, further comprising the steps of:
directing the coalesced gas bubbles into a third mixing cell of the liquid located above the second mixing cell; and
directing the coalesced gas bubbles into a fourth mixing cell of the liquid located above the third mixing cell.

21. The method of claim 15, further comprising the steps of:
reacting a first group of molecules with the gas bubbles in the second mixing cell to produce a second group of molecules;
crystallizing the second group of molecules into solid particles defining an average particle size;
precipitating the solid particles down onto a disc attached to the shaft and located beneath a lower edge of the funnel;
rotating the disc to direct the solid particles out of the funnel and into the first mixing cell;
increasing the average particle size of the solid particles relative to the average particle size in the first mixing cell; and
removing the solid particles from the vessel.

22. The method of claim 21, wherein the first group of molecules includes calcium sulfite hemihydrate and the second group of molecules includes gypsum.

23. The method of claim 21, further comprising the steps of:
reacting a third group of molecules with the gas bubbles in a third mixing cell of the liquid located above the second mixing cell to produce a fourth group of molecules;
crystallizing the fourth group of molecules into solid particles;
reacting a fifth group of molecules with the gas bubbles in a fourth mixing cell of the liquid located above the third mixing cell to produce a sixth group of molecules; and
crystallizing the sixth group of molecules into solid particles.

* * * * *